(12) United States Patent
Solowiej

(10) Patent No.: US 6,966,147 B2
(45) Date of Patent: Nov. 22, 2005

(54) AUTOMATIC PET DOOR

(76) Inventor: Henry E. Solowiej, 1654 Tustin Ave., Costa Mesa, CA (US) 92627

( * ) Notice: Subject to any disclaimer, the term of this patent is extended or adjusted under 35 U.S.C. 154(b) by 0 days.

(21) Appl. No.: 10/795,483

(22) Filed: Mar. 9, 2004

(65) Prior Publication Data
US 2005/0198901 A1    Sep. 15, 2005

(51) Int. Cl.[7] .............................................. E06B 1/28
(52) U.S. Cl. .................................... 49/169; 49/360
(58) Field of Search .................... 49/169, 25, 360; 160/180

(56) References Cited

U.S. PATENT DOCUMENTS

| | | | |
|---|---|---|---|
| 4,322,913 A * | 4/1982 | Himmer | 49/168 |
| 4,908,987 A * | 3/1990 | Dickson et al. | 49/169 |
| 5,072,544 A * | 12/1991 | Breck, Jr. | 49/264 |
| 5,177,900 A | 1/1993 | Solowiej | |
| 5,872,516 A * | 2/1999 | Bonge, Jr. | 340/573.3 |
| 6,691,463 B1 * | 2/2004 | Richmond | 49/360 |

* cited by examiner

Primary Examiner—Jerry Redman
(74) Attorney, Agent, or Firm—Vladimir Khiterer

(57) ABSTRACT

An automatic pet door system is disclosed. The automatic pet door system has a rectangular frame mounted between studs of a wall defining a passage for entry and exit of a pet. A door slidably moves within the frame between a lower closed position for closing the passage and an upper open position for opening the passage. The door is lifted by a drive means having a motor pulling a cable attached to the door. The motor is energized by a control means in response to a signal received from a magnetic transmitter worn by a pet when the pet approaches the door. A locking means prevents movement of the door upwardly from the closed position unless the door is moved by way of the drive means.

19 Claims, 4 Drawing Sheets

AUTOMATIC PET DOOR

FIELD OF THE INVENTION

The present invention pertains to an automatic pet door that opens automatically without the pet having to physically touch or push against the door mechanism.

BACKGROUND OF THE INVENTION

Pet doors available on the market today generally consist of soft plastic or aluminum materials which hang by gravity, typically from a swingably mounted utility door, and are sealed by magnetic means. Other doors have an overlapping of plastic material in such a way as to prevent excessive weather penetration. Both of these pet door devices operate by means of the pet having to push against the door or flap with its head in order to enter or exit.

A significant disadvantage of these pet doors of the prior art is that some pets (especially small pets) simply will not push against the door for one reason or another. Most other pet doors are installed in the rear swinging door of the garage. Another disadvantage is the inconvenience of having a flap door mechanism extending from a utility door with the possibility of snagging or catching the operator. Another disadvantage is that swinging doors of the prior art take up valuable wall space when they are opened, in addition to posing the hazards of snagging or injuring those nearby.

A further disadvantage is that the magnetic flaps or plastic materials used for weatherproofing many prior art pet doors do not match to the intended correct closed position. For this reason, installation of these conventional pet doors in the main living quarters of the house is not practical. Moreover, conventional pet doors of the prior art also permit access to potential thieves and other animals and rodents.

Many of the above disadvantages have been overcome in the automatic pet door disclosed in the U.S. Pat. No. 5,177,900 to Solowiej. The U.S. Pat. No. 5,177,900 discloses an automatic pet door apparatus with a door vertically slidable within the frame between closed and open positions by way of a driver in response to a signal. A pet wears a radiation transmitter that produces the signal activating a transducer, causing the driver to be energized and raise the door. However, the automatic pet door apparatus disclosed in the U.S. Pat. No. 5,177,900 has disadvantages in that the driver disclosed therein is unreliable and does not provide efficient way to prevent unauthorized opening of the door, and also, the radiation transmitter requires a battery to operate, which makes it unreliable (due to battery discharge, exposure to water and shock), as well as bulky to wear for small pets.

Thus, there is a need for a pet door that overcomes the above disadvantages, being operated without the pet having to force it open, yet being secure against thieves and is reliably weatherproof, and is inexpensive to provide and install.

SUMMARY OF THE INVENTION

The present invention is directed to an automatic pet door system that satisfies this need. The automatic pet door system according to this invention has a rectangular frame having two substantially parallel columns mounted vertically between studs of a wall, each of the columns comprising a channel disposed along the length of the column, such that openings of the channels are facing each other. The frame also has a top plate disposed between top portions of the columns and a bottom plate disposed between bottom portions of the columns.

A lower portion of the frame defines a passage between opposite sides of the wall for a pet to enter of exit through the passage. There is provided a door, formed of a rigid translucent polymer, slidably movable within the channels between a lower closed position for closing the passage and an upper open position for opening the passage.

There is also provided a drive means lifting the door between the closed and open positions. The drive means has a motor disposed on one of the columns; a primary pulley mounted on the motor; a secondary pulley mounted on the top plate; a pivot pin means disposed on the door; a locking means disposed on the door. The locking means prevents movement of the door upwardly from the closed position unless the door is moved by way of the drive means.

There is provided a cable having a first end fixedly attached to the primary pulley and a second end fixedly attached to the locking means, such that the cable rises at a substantially 30 degree angle from horizontal from the primary pulley to the secondary pulley, feeding over the secondary pulley. The cable then descends at a substantially 90 degree angle from horizontal to the pivot pin means, feeding through the pivot pin means and leading, substantially horizontally, from the pivot pin means to the locking means.

The motor, when energized, spins the primary pulley thereby causing the cable to pull the door up to the open position. When the motor is not energized, it allows the door to move down to the closed position by way of the force of gravity.

There is provided a magnetic transmitter worn by a pet. The magnetic transmitter produces a predetermined transmitter signal. The magnetic transmitter requires no battery and is water-proof and shock-proof. There is also provided a detector means located proximate the frame. The detector means generates a detector signal in response to the transmitter signal when the pet approaches the frame from one side of the wall at a predetermined distance from the frame. A control means electrically connected to the detector means and to the motor energizes the motor in response to the detector signal. The control means comprises a timer means maintaining the motor energized for a predetermined period of time following energizing in response to the transducer signal.

The locking means comprises a U-shaped bracket having a pair of holes in its flanges; a pin having a proximate end and a distal end, the pin disposed substantially horizontally within the holes, such that the proximate and distal ends project outside the flanges; a compression spring disposed between the flanges, the compression spring biasing the pin towards the distal end; a tension spring having one end attached to the proximate end and the other end attached to the second end of the cable; an opening disposed in the column for receiving and engaging with the distal end when the door is lowered in the closed position, thereby preventing lifting the door by an external force.

To summarize, the present invention provides the following advantages over the pet doors of the prior art:
1. It works for pets that will not push against conventional doors by opening automatically;
2. It provides good weather seal in that the door operated by sliding in the channels:
3. The combination of the magnetic transmitter the detector means prevents entrance of strange animals;

4. An owner is enabled to make the automatic pet door system available only to the selected pets wearing the magnetic transmitter;
5. The automatic pet door system fits between wall studs and can be installed in many new and existing structures such as dwellings;
6. The moving parts of the automatic pet door system are concealed and hidden inside the wall for preventing damage or harm to either the pet or its owner;
7. The transparent or translucent material of the door permits the pet to see where it wants to go; and
8. The mechanism of the automatic pet door system automatically locks in the closed position of the door, and unlocks only when the motor is activated.
9. No batteries are required for the magnetic transmitter, which is also water-proof and shock-proof.
10. The door can be opened from a distance of up to 4 feet.
11. The magnetic transmitter utilizes tiny magnets, which makes it small enough for small dogs and cats.

BRIEF DESCRIPTION OF THE DRAWINGS FIGURES

DETAILED DESCRIPTION OF THE PREFERRED EMBODIMENT

Figure 1:
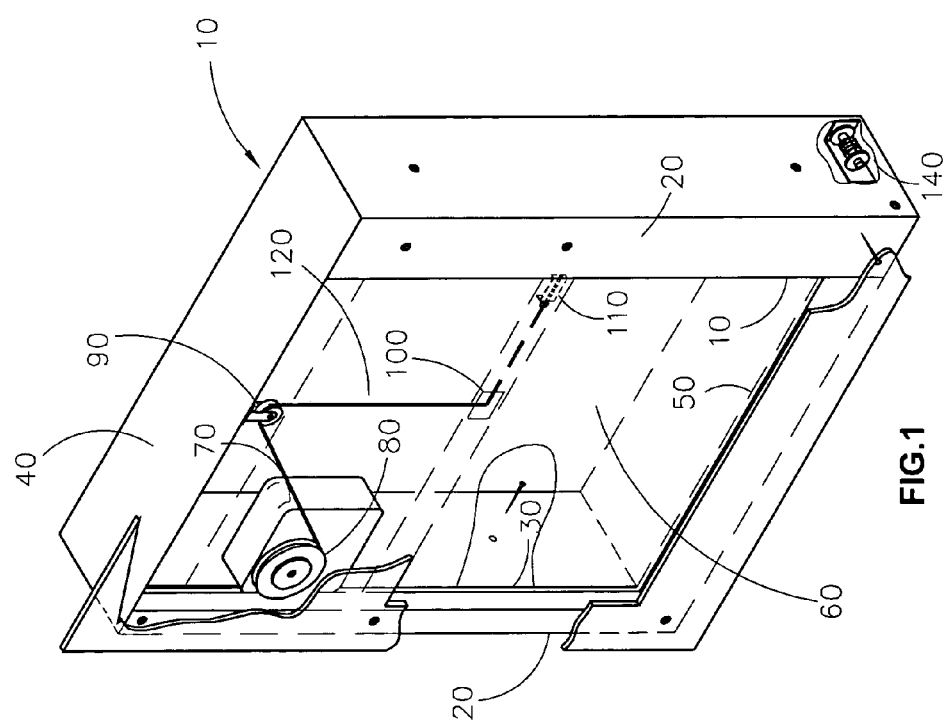
FIG. 1 is an isometric view of an automatic pet door system according to the present invention.
Figure 2:
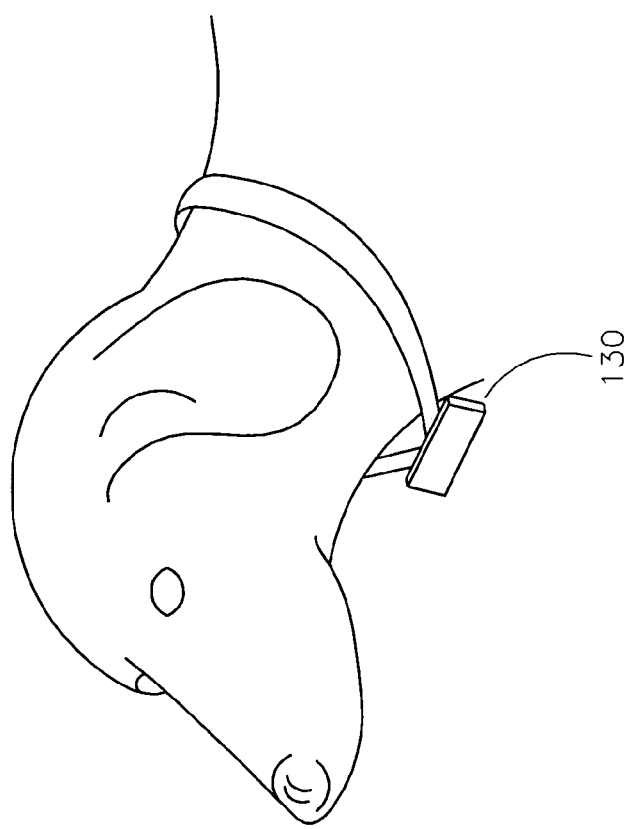
FIG. 2 is a view of the magnetic transmitter being carried by a pet for actuating the pet door system according to the present invention.
Figure 3:
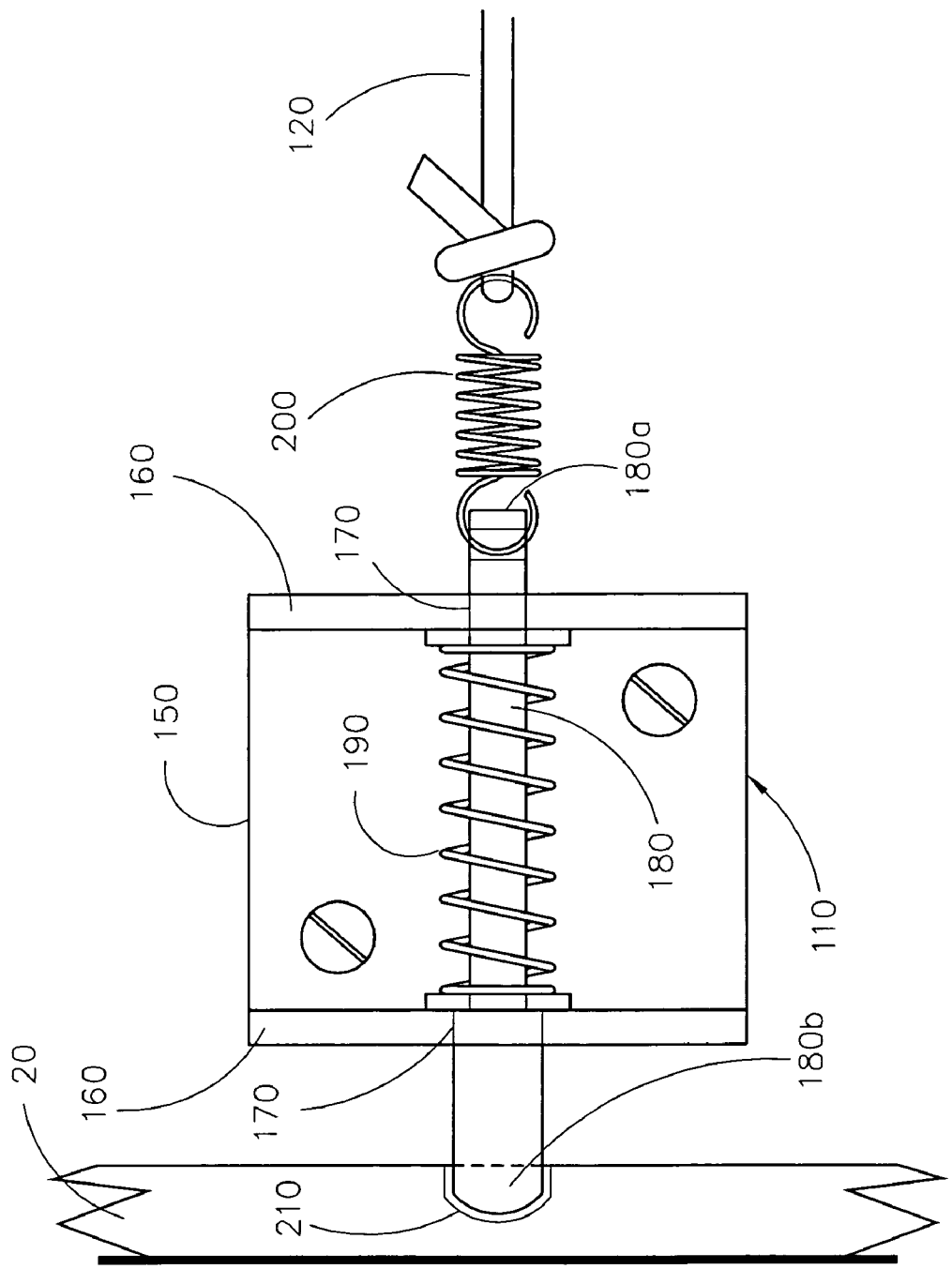
FIG. 3 is a side elevational view of the locking means for use with the pet door system according to the present invention.

This invention will be better understood with the reference to the drawing figures FIG. 1 through FIG. 3. The same numerals indicate the same elements in all drawing figures. Viewing FIG. 1, there is shown an isometric view of an automatic pet door system according to the present invention. Numeral 10 indicates a frame. Frame 10 has a rectangular shape approximately 30" high and 14" wide and is formed of extruded aluminum or other suitable material such as plastic or wood. The size of frame 10 can vary to accommodate small or large pets. The height can vary from approximately 24" to approximately 45". The width can vary from approximately 8" to approximately 18".

Frame 10 comprises columns indicated by numeral 20. Columns 20 are substantially parallel and are mounted vertically between studs of a wall. In the preferred embodiment shown in FIG. 1, frame 10 has a width not greater than approximately 14.25" for installation between a pair of studs. The studs in FIG. 1 are shown as standard 2×4 lumber measuring approximately 1.5" by 3.5" in cross-section and having a spacing of 16" on center (it can also be 2×6 lumber measuring approximately 1.5" by 5.5"). Installation of frame 10 between studs of a wall is readily apparent to the persons knowledgeable in the pertinent arts. Needless to say, the width of frame 10 can vary to accommodate the size of the pet, it can be 8" or more, for example, 12", 14", 16" or 18".

Each of columns 20 comprises a channel indicated by numeral 30. Each channel 30 is disposed along the length of column 20, such that openings of channels 30 are facing each other.

Numeral 40 indicates a top plate. Top plate 40 is disposed between top portions of columns 20.

Numeral 50 indicates a bottom plate. Bottom plate is disposed between bottom portions of columns 20.

A lower portion of frame 10 defines a passage between opposite sides of the wall. This passage is used by pets entering and exiting through the pet door system according to the present invention.

Columns 20, top plate 40 and bottom plate 50 can be made from lengths of an aluminum extrusion, having channels 30 formed within a thin-wall rectangular cross-section (approximately 2.0" by approximately 3.88") and may include grooved bosses for receiving suitable self-tapping fasteners by which the components of the frame 10 are rigidly connected.

Numeral 60 indicates a door. Door 60 is slidably movable within channels 30 between a lower closed position for closing the passage and an upper open position for opening the passage. In the preferred embodiment shown in FIG. 1, door 60 is shown as formed of a rigid translucent polymer. However, door 60 can be formed of any suitable material, such transparent to translucent plastic material such as RTM, Lexan, as well as wood or metal. The advantage of having door 60 formed of a translucent material is that it permits the pet to see where it wants to go.

Door 60 is lifted between the closed and open positions by way of a drive means comprising motor indicated by numeral 70. Motor 70 is disposed on one of columns 20. Numeral 80 indicates a primary pulley. Primary pulley 80 is mounted on motor 70.

Numeral 90 indicates a secondary pulley. Secondary pulley 90 is mounted on top plate 40.

Numeral 100 indicates a pivot pin means. Pivot pin means 100 is disposed on door 60. In the preferred embodiment shown in FIG. 1, pivot pin means 100 is disposed on the upper portion of door 60, substantially in the middle of door 60.

Numeral 110 indicates a locking means. Locking means 110 is disposed on door 60. In the preferred embodiment shown in FIG. 1, locking means 110 is disposed on the upper corner of door 60. Locking means 110 prevents movement of door 60 upwardly from the closed position unless door 60 is moved by way of the drive means. Locking means 110 will be described in more detail below, in reference to FIG. 3.

Numeral 120 indicates a cable. Cable 120 has a first end fixedly attached to primary pulley 80 and a second end fixedly attached to locking means 110, such that cable 120 rises at a substantially 30 degree angle from horizontal from primary pulley 80 to secondary pulley 90, feeding over secondary pulley 90. Cable 120 then descends at a substantially 90 degree angle from horizontal to pivot pin means 100, feeding through pivot pin means 100. Cable 120 then leads, substantially horizontally, from pivot pin means 100 to locking means 110.

Motor 70, when energized, spins primary pulley 80, thereby causing cable 120 to pull door 60 up to the open position. In the preferred embodiment shown in FIG. 1, there is provided a clutch between motor 70 and primary pulley 80 (not shown). The clutch permits motor 70 to continue operation at limited power by slipping when door 60 is lifted in the open position. The operation of the clutch is readily apparent to the persons knowledgeable in the pertinent arts.

Motor 70, when not energized, allows door 60 to move down to the closed position by way of the force of gravity.

Viewing now FIG. 2, there is shown a magnetic transmitter indicated by numeral 130. Magnetic transmitter 130 is worn by a pet (shown in FIG. 2 as a dog), preferably attached to the collar worn by the pet. Magnetic transmitter 130 produces a predetermined transmitter signal.

Viewing again FIG. 1, numeral 140 indicates a detector means. Detector means 140 is located proximate frame 10 and is shown in FIG. 1 near bottom plate 50. Detector means 140 generates a detector signal in response to the transmitter signal when the pet approaches frame 10 from one side of the wall at a predetermined distance from frame 10. In the preferred embodiment shown in FIG. 1, the predetermined distance from frame 10 ranges from about six inches to about four feet.

Figure 4:
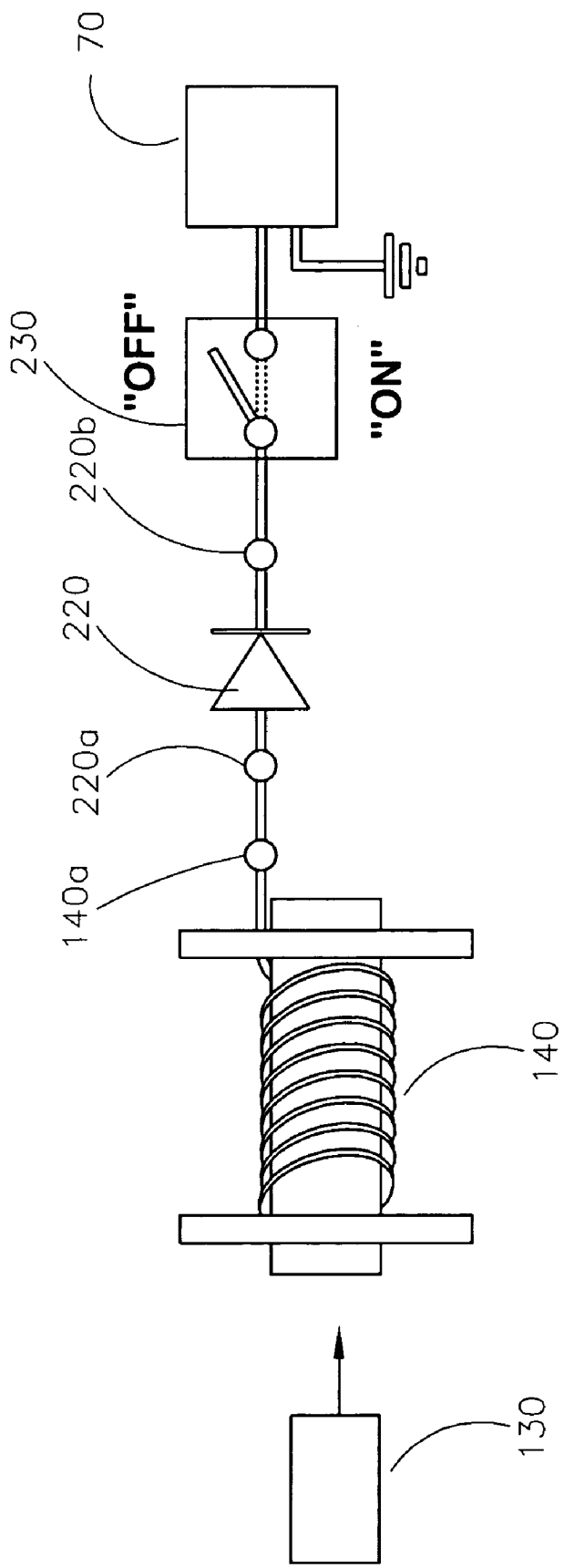
FIG. 4 is a block diagram of a control means for use with the pet door system according to the present invention.

Viewing now FIG. 4, there is shown a block diagram of a control means. The control means is electrically connected to detector means 140 and to motor 70. Detector means 140 is shown in FIG. 4 as an induction coil. Numeral 140a indicates an induction coil output. Induction coil 140 generates the detector signal at induction coil output 140a in the form of a voltage induced by movement of magnetic transmitter 130 with respect to induction coil 140.

Numeral 220 indicates an AC amplifier. AC amplifier 220 has an amplifier input indicated by numeral 220a and an amplifier output indicated by numeral 220b. Amplifier input 220a is connected to induction coil output 140a. Amplifier output 220b is connected to an AC power switch indicated by numeral 230. AC power switch 230 can be placed in an "on" position and in an "off" position.

The voltage applied to amplifier input 220a causes AC amplifier 220 to output a switching signal at amplifier output 220b. The switching signal causes AC power switch 230 to be placed in the "on" position. Placing AC power switch 230 in the "on" position causes motor 70 to be energized. AC power switch 230 is preferably a solid-state switch that applies 120 Vac line power to motor 70.

By way of experiments, it has been discovered that a domestic pet moves its head at a rate of about 1 Hz, while approaching door 60. Keeping in mind that magnetic transmitter 130 is attached to the pet's collar, to insure that the pet will successfully use door 60, it is required to open door 60 while the pet is approaching (if door 60 were to fail to open, the pet might not try again).

Magnetic transmitter 130 comprises a water-proof and shock-proof magnet that comes in different sizes depending on the size of the pet. Smaller dogs and cats can use a tiny (literally sugar-size) magnets. Accordingly, it is nearly impossible to detect the small magnetic field produced by these tiny magnets by using a Hall-effect or a similar magnetic field transducer due to the extremely high-gain amplification required of a tiny DC sensed voltage. In fact, drift in the Earth's magnetic field can cause induced voltages in induction coil 140 of the same magnitude as the magnets used in magnetic transmitter 130 at a 4 foot distance, causing unintended opening of door 60. That is why the present invention uses a tuned AC amplifier instead of a DC amplifier. Specifically, in the preferred embodiment described in reference to FIG. 4, AC amplifier 220 is tuned to the frequency of about 1 Hz. As the persons knowledgeable in the pertinent arts will recognize, this can be done by way of a filter. Further, by way of experiments, it has been discovered that a large number of windings in induction coil 140 is required to enable magnetic tuning of 1 Hz. In the preferred embodiment described in reference to FIG. 4, the number of windings in induction coil 140 is about 10,000.

As seen from this disclosure, this invention successfully allows only intended pets (i.e. those equipped with magnetic transmitter 130) to open door 60, while discriminating against ambient magnetic disturbances that may cause unintended opening of door 60.

In the preferred embodiment shown in FIG. 1, the control means further comprises a timer means maintaining motor 70 energized for a predetermined period of time following energizing in response to the detector signal. This maintains door 60 in the open position, allowing the pet sufficient time to enter or exit through the passage. The time can be adjusted, depending on behavior of a particular pet. In the preferred embodiment shown in FIG. 1, the predetermined period of time ranges from about one second to about ten seconds. If desired, the predetermined period of time can be set to more than 10 seconds.

Electrical power for operating the automatic pet door system according to this invention is typically available in the wall from electrical lines that power conventional wall plug boxes (not shown).

Viewing now FIG. 3, there is shown locking means 110. Numeral 150 indicates a U-shaped bracket. U-shaped bracket 150 has flanges indicated by numeral 160 and holes indicated by numeral 170 disposed in flanges 160.

Numeral 180 indicates a pin. Pin 180 has a proximate end indicated by numeral 180a and a distal end indicated by numeral 180b. Pin 180 is disposed substantially horizontally within holes 170, such that proximate end 180a and distal ends 180b project outside flanges 160.

Numeral 190 indicates a compression spring. Compression spring 190 is disposed between flanges 160. Compression spring 190 biases pin 180 towards distal end 180b.

Numeral 200 indicates a tension spring. Tension spring 200 has one end attached proximate end 180a and the other end attached to the second end the cable 120.

Numeral 210 indicates an opening. Opening 210 is disposed in column 20. Opening 210 receives and engages with distal end 180b when door 60 is lowered in the closed position, thereby preventing lifting door 60 by an external force. When motor 70 is energized, cable 120 pulls on tension spring 200 causing pin 180 to retract from opening 210 and allowing door 60 to be lifted in the open position.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. An automatic pet door system comprising:
   (a) a rectangular frame comprising:
       two substantially parallel columns mounted vertically between studs of a wall, each of the columns comprising a channel disposed along the length of the column, such that openings of the channels are facing each other;
       a top plate disposed between top portions of the columns;
       a bottom plate disposed between bottom portions of the columns;
       wherein a lower portion of the frame defines a passage between opposite sides of the columns;

(b) a door slidably movable within the channels between a lower closed position for closing the passage and an upper open position for opening the passage;

(c) a drive means lifting the door between the closed and open positions, comprising:
- a motor disposed on one of the columns;
- a primary pulley mounted on the motor;
- a secondary pulley mounted on the top plate;
- a pivot pin means disposed on the door;
- a locking means disposed on the door, the locking means preventing movement of the door upwardly from the closed position unless the door is moved by way of the drive means;
- a cable having a first end fixedly attached to the primary pulley and a second end fixedly attached to the locking means, such that the cable is rising at a substantially 30 degree angle from horizontal from the primary pulley to the secondary pulley, feeding over the secondary pulley, descending at a substantially 90 degree angle from horizontal to the pivot pin means, feeding through the pivot pin means and leading, substantially horizontally, from the pivot pin means to the locking means;
- wherein the motor, when energized, spinning the primary pulley thereby causing the cable to pull the door up to the open position, and wherein the motor, when not energized, allowing the door to move down to the closed position by way of the force of gravity;

(d) a magnetic transmitter worn by a pet, the magnetic transmitter producing a predetermined transmitter signal;

(e) a detector means located proximate the frame, the detector means generating a detector signal in response to the transmitter signal when the pet approaches the frame from one side of the wall at a predetermined distance from the frame;

(f) a control means electrically connected to the detector means and to the motor energizing the motor in response to the detector signal.

2. The automatic pet door system as in claim 1, wherein the locking means comprises:
- a U-shaped bracket having a pair of holes in its flanges;
- a pin having a proximate end and a distal end, the pin disposed substantially horizontally within the holes, such that the proximate and distal ends project outside the flanges;
- a compression spring disposed between the flanges, the compression spring biasing the pin towards the distal end;
- a tension spring having one end attached to the proximate end and the other end attached to the second end of the cable;
- an opening disposed in the column for receiving and engaging with the distal end when the door is lowered in the closed position, thereby preventing lifting the door by an external force.

3. The automatic pet door system as in claim 2, wherein the detector means comprises an induction coil having about ten thousand windings, such that the induction coil generates the detector signal at an induction coil output in the form of a voltage induced by movement of the magnetic transmitter with respect to the induction coil.

4. The automatic pet door system as in claim 3, wherein the control means comprises:
- an AC amplifier having an amplifier input and an amplifier output, the amplifier input connected to the induction coil output, the amplifier output connected to an AC power switch that can be placed in an "on" position and in an "off" position;
- wherein the voltage applied to the amplifier input causes the AC amplifier to output a switching signal at the amplifier output, the switching signal causing the AC power switch to be placed in the "on" position;
- wherein placing the AC power switch in the "on" position causes the motor to be energized;
- wherein the AC amplifier is tuned to the frequency of about 1 Hz.

5. The automatic pet door system as in claim 4, wherein the control means further comprises a timer means maintaining the motor energized for a predetermined period of time following energizing in response to the detector signal.

6. The automatic pet door system as in claim 5, wherein the predetermined period of time ranges from about one second to about ten seconds.

7. The automatic pet door system as in claim 6, wherein the predetermined distance from the frame ranges from about six inches to about four feet.

8. The automatic pet door system as in claim 7, wherein the frame has a width not greater than approximately 14.25 inches for installation between a pair of studs.

9. The automatic pet door system as in claim 8, wherein the door is formed of a rigid translucent polymer.

10. The automatic pet door system as in claim 7, wherein the frame has a width not less than approximately 8 inches.

11. The automatic pet door system as in claim 10, wherein the door is formed of a rigid translucent polymer.

12. The automatic pet door system as in claim 7, wherein the frame has a width of approximately 12 inches.

13. The automatic pet door system as in claim 12, wherein the door is formed of a rigid translucent polymer.

14. The automatic pet door system as in claim 7, wherein the frame has a width of approximately 14 inches.

15. The automatic pet door system as in claim 14, wherein the door is formed of a rigid translucent polymer.

16. The automatic pet door system as in claim 7, wherein the frame has a width of approximately 16 inches.

17. The automatic pet door system as in claim 16, wherein the door is formed of a rigid translucent polymer.

18. The automatic pet door system as in claim 7, wherein the frame has a width of approximately 18 inches.

19. The automatic pet door system as in claim 18, wherein the door is formed of a rigid translucent polymer.

* * * * *